United States Patent
Belote et al.

(10) Patent No.: US 9,762,812 B2
(45) Date of Patent: Sep. 12, 2017

(54) DUAL-FIELD-OF-VIEW OPTICAL SYSTEM

(71) Applicant: RAYTHEON COMPANY, Waltham, MA (US)

(72) Inventors: Brent Belote, Allen, TX (US); James Robarge, Dallas, TX (US); Mark Noethen, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 28 days.

(21) Appl. No.: 14/927,756

(22) Filed: Oct. 30, 2015

(65) Prior Publication Data
US 2017/0126986 A1 May 4, 2017

(51) Int. Cl.
*G02B 27/10* (2006.01)
*H04N 5/265* (2006.01)
*H04N 5/235* (2006.01)
*H04N 5/232* (2006.01)
*H04N 5/225* (2006.01)

(52) U.S. Cl.
CPC ......... *H04N 5/265* (2013.01); *G02B 27/1066* (2013.01); *H04N 5/2254* (2013.01); *H04N 5/2259* (2013.01); *H04N 5/2353* (2013.01); *H04N 5/23238* (2013.01)

(58) Field of Classification Search
None
See application file for complete search history.

(56) References Cited

U.S. PATENT DOCUMENTS

| | | | |
|---|---|---|---|
| 4,574,197 A | 3/1986 | Kliever | |
| 5,049,740 A * | 9/1991 | Pines | H04N 3/09 244/3.16 |
| 5,161,051 A | 11/1992 | Whitney et al. | |
| 5,172,235 A * | 12/1992 | Wilm | H04N 5/2254 348/149 |
| 8,563,929 B2 | 10/2013 | Vizgaitis | |
| 8,593,729 B2 | 11/2013 | Vizgaitis | |

(Continued)

FOREIGN PATENT DOCUMENTS

WO   2010/094133 A1   8/2010

OTHER PUBLICATIONS

Partial International Search Report for PCT Application No. PCT/US2016/045703 dated Nov. 28, 2016.

(Continued)

*Primary Examiner* — Twyler Haskins
*Assistant Examiner* — Wesley Chiu
(74) *Attorney, Agent, or Firm* — Lando & Anastasi, LLP (57) ABSTRACT

A dual-field-of-view (FOV) optical imaging system having a primary FOV and a simultaneously viewable secondary FOV. One example of the system includes an imaging sensor, primary and secondary FOV objective optics configured to receive and output electromagnetic radiation corresponding to the primary FOV and secondary FOV, respectively, imager optics, and a field-of-view selection mechanism disposed between the secondary FOV objective optics and the imager optics and configured to selectively pass the second FOV to the imager optics, the imaging sensor being configured to produce primary FOV image frames and combined image frames that include imagery from both the primary and secondary fields-of-view.

13 Claims, 8 Drawing Sheets

(56) References Cited

U.S. PATENT DOCUMENTS

| | | | |
|---|---|---|---|
| 2004/0218833 A1* | 11/2004 | Ejiri | G06T 7/0024 |
| | | | 382/284 |
| 2005/0029458 A1* | 2/2005 | Geng | G08B 13/19608 |
| | | | 250/347 |
| 2008/0218851 A1 | 9/2008 | Chen et al. | |
| 2010/0238327 A1* | 9/2010 | Griffith | H04N 5/2251 |
| | | | 348/240.99 |
| 2010/0283842 A1* | 11/2010 | Guissin | G02B 13/06 |
| | | | 348/68 |
| 2011/0085066 A1* | 4/2011 | Sugawa | H04N 5/378 |
| | | | 348/302 |
| 2011/0176048 A1* | 7/2011 | Rockley | G02B 27/1066 |
| | | | 348/340 |
| 2011/0315878 A1 | 12/2011 | Vizgaitis | |
| 2014/0233027 A1* | 8/2014 | Sutin | G01J 3/024 |
| | | | 356/303 |
| 2015/0028194 A1 | 1/2015 | Cook | |

OTHER PUBLICATIONS

International Search Report and Written Opinion for application No. PCT/US2016/045703 dated Feb. 13, 2017.

\* cited by examiner

DUAL-FIELD-OF-VIEW OPTICAL SYSTEM

BACKGROUND

A variety of electro-optical (EO) sensor systems are required to be operated at high magnification with a narrow field-of-view (NFOV) in order to detect and identify targets at long range. However, operators of such systems often complain of a resulting "soda straw" view or lack of situational awareness due to the very narrow field-of-view (e.g., less than 5°). Accordingly, it is often desirable to also provide access to a wide field-of-view (WFOV) mode. Conventional dual-FOV systems either require switching hardware that obscures the narrow field-of-view while the wide field-of-view is being viewed and vice versa, or an additional sensor, and sometimes additional optics, to simultaneously collect energy from both fields-of-view. Both solutions have associated drawbacks. The need to provide multiple sensors and multiple optical paths undesirably adds to the size, weight, power, and cost (often referred to as SWaP-C) metrics of the systems. In simultaneous dual sensor systems, significant bandwidth is required to maintain both full motion video "FMV" streams, potentially limiting the quality of said video and other system features. Switching between the wide field-of-view and the narrow field-of-view causes delay, particularly in systems that require manual switching, and at times causes loss of tracking on a target, requiring reacquisition, due to the narrow field-of-view being obscured while energy is being collected from the wide field-of-view.

SUMMARY OF INVENTION

Aspects and embodiments are directed to optical systems that are configured to provide simultaneous viewing or imaging of multiple fields-of-view using a single imaging sensor.

According to one embodiment a dual-field-of-view optical imaging system having a primary field-of-view and a secondary field-of-view comprises a detector assembly including an imaging sensor, primary field-of-view objective optics configured to receive first electromagnetic radiation from a scene and to output the first electromagnetic radiation corresponding to the primary field-of-view of the system, and secondary field-of-view objective optics configured to receive second electromagnetic radiation from the scene and to output the second electromagnetic radiation corresponding to the secondary field-of-view of the system. The system further comprises imager optics configured to receive and focus the first electromagnetic radiation onto the imaging sensor, the imaging sensor being configured to produce primary field-of-view image frames from the first electromagnetic radiation, and a field-of-view selection mechanism disposed between the secondary field-of-view objective optics and the imager optics and configured to selectively pass the second electromagnetic radiation to the imager optics, the imager optics being further configured to focus the second electromagnetic radiation onto the imaging sensor, and the imaging sensor being further configured to produce combined image frames from the first electromagnetic radiation and the second electromagnetic radiation together, the combined image frames including imagery from both the primary and secondary fields-of-view.

In one example the field-of-view selection mechanism includes a shutter at least a portion of which is selectively movable into an optical path between the secondary field-of-view objective optics and the imager optics to block the second electromagnetic radiation from the imager optics, and selectively movable out of the optical path to pass the second electromagnetic radiation to the imager optics. In another example the field-of-view selection mechanism includes a rotating shutter wheel having a transmissive portion that passes the second electromagnetic radiation and a blocking portion that blocks the second electromagnetic radiation. In another example the field-of-view selection mechanism includes a beamsplitter disposed between the imager optics and both the primary and secondary field-of-view objective optics, and a shutter positioned between the secondary field-of-view objective optics and the beamsplitter, the shutter having an open state in which the second electromagnetic radiation is directed to the beamsplitter and a closed state in which the second electromagnetic radiation is blocked from reaching the beamsplitter. In one example, when the shutter is in the closed state, the beamsplitter is configured to transmit a first portion of the first electromagnetic radiation to the imager optics and to reflect a second portion of the first electromagnetic radiation, and when the shutter is in the closed state, the beamsplitter is configured to receive and combine the first and second electromagnetic radiation, to transmit the first portion of the first electromagnetic radiation to the imager optics and to reflect the second portion of the first electromagnetic radiation, and to transmit a first portion of the second electromagnetic radiation to the imager optics and reflect a second portion of the second electromagnetic radiation with the second portion of the first electromagnetic radiation.

The system may further comprise image processing circuitry coupled to the imaging sensor and configured to receive and process the primary field-of-view image frames and the combined image frames from the imaging sensor, and to output first display images produced from the primary field-of-view image frames and corresponding to the primary field-of-view, and second display images produced from a combination of the primary field-of-view image frames and the combined image frames and corresponding approximately to the secondary field-of-view. In one example the imaging processing circuitry includes a frame buffer configured to store the primary field-of-view image frames sequentially one-by-one. In another example the image processing circuitry includes an image reconstruction module coupled to the frame buffer and configured, for each combined image frame, to receive the combined image frame, receive a prior stored primary field-of-view image frame from the frame buffer, compare the combined image frame with the stored primary field-of-view image frame to determine a content delta between the combined image frame and the stored primary field-of-view image frame, and produce an approximate secondary field-of-view image frame based on the content delta. In another example the image processing circuitry is configured to process the approximately secondary field-of-view images to produce the second display images.

According to another embodiment a method of simultaneously viewing two fields-of-view in an optical imaging system comprises acts of collecting, over a primary field-of-view, first electromagnetic radiation energy at an imaging sensor and producing therefrom a plurality of primary image frames, simultaneously collecting, over a secondary field-of-view, second electromagnetic radiation energy using secondary objective optics, selectively directing the second electromagnetic radiation energy to the imaging sensor, at the imaging sensor, producing a plurality of combined image frames from a combination of the first electromagnetic radiation energy and the second electromagnetic radiation energy, processing the plurality of primary image frames and the plurality of combined image frames to produce a first display image stream corresponding to the primary field-of-view and a second display image stream corresponding approximately to the secondary field-of-view, and displaying the first and second display image streams.

In one example selectively directing the second electromagnetic radiation to the imaging sensor includes selectively moving a shutter into an optical path between the secondary objective optics and the imaging sensor to block the second electromagnetic radiation energy from reaching the imaging sensor, and selectively moving the shutter out of the optical path to allow the second electromagnetic radiation energy to reach the imaging sensor.

In another example processing the plurality of primary image frames and the plurality of combined image frames includes sequentially storing each one of the plurality of primary image frames in a frame buffer. In one example processing the plurality of primary image frames and the plurality of combined image frames further includes producing a plurality of secondary image frames by, for each combined image frame of the plurality of combined image frames: receiving the combined image frame at an image reconstruction module, receiving a prior stored primary image frame at the image reconstruction module from the frame buffer, and with the image reconstruction module, comparing the combined image frame and the prior stored primary image frame and subtracting imagery in the prior stored primary image frame from imagery in the combined image frame to produce a secondary image frame that corresponds approximately to the secondary field-of-view. In one example producing the second display image stream includes processing the plurality of secondary image frames.

The method may further include dynamically adjusting a saturation threshold of the imaging sensor, for example.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to an optical system configured to allow simultaneous or temporally multiplexed collection and viewing of two optical fields-of-view in a single detector assembly. In particular, certain embodiments provide the capability to image both a wide field-of-view and a narrow field-of-view using common (shared) imager optics and a single imaging sensor. This avoids the need for multiple sensors and associated optics as are commonly required for conventional dual-field-of-view imaging systems. As discussed in more detail below, a field-of-view selection mechanism and computational methods are used to parse and recombine separate or individual fields-of-view into a single channel for use by a single sensor. In certain embodiments, two different fields-of-view are combined by temporally switching the different fields-of-view into and out of the imaging optical path using a shutter or rotating mirror, for example. In other embodiments, the two different fields-of-view are combined by temporally modulating the imagery from both fields-of-view onto the imaging sensor so to be able to separate the two images via image processing. The output includes two complementary fields-of-view from the single sensor, to be used or viewed by an operator using any of a variety of viewing modes, such as, for example, split-screen viewing, picture-in-picture, or dual monitor display. As discussed further below, in certain embodiments, a primary field-of-view, for example the narrow field-of-view, is always imaged, and the field-of-view selection mechanism is configured to selectively couple a secondary field-of-view, for example, the wide field-of-view, into the imaging optical path without obscuring the primary field-of-view. This provides the advantage of avoiding loss of target or other drawbacks associated with conventional dual-field-of-view systems in which the primary field-of-view is always obscured in order to allow viewing/imaging of another field-of-view.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
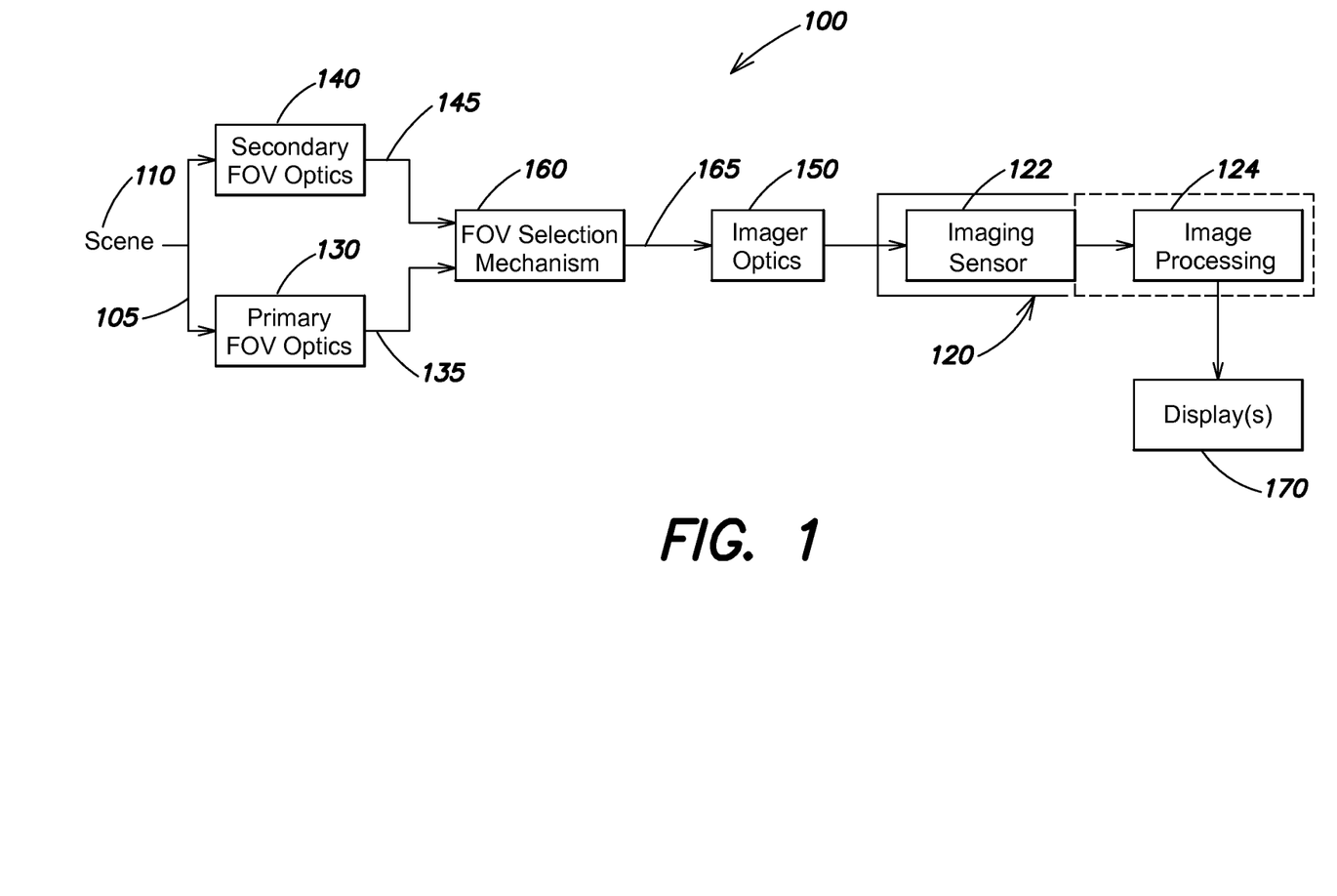
FIG. 1 is a block diagram of one example of a dual-field-of-view optical system according to aspects of the present invention.

Referring to FIG. 1, there is illustrated a block diagram of a dual-field-of-view optical system 100 according to certain embodiments. Electromagnetic radiation 105, including but not limited to visible light or infrared electromagnetic radiation, for example, from a viewed scene 110 is collected and imaged at a detector assembly 120. The detector assembly 120 includes an imaging sensor 122, such as a focal plane array (FPA), for example. The imaging sensor 122 includes photo-sensitive elements, generally a two-dimensional array of photo-sensitive pixels, along with associated electronics to read out image data from the photo-sensitive elements and construct an image of the scene 110. Such imaging sensors and read-out electronics, and the operation thereof, are well understood by those skilled in the art. As discussed in more detail below, the detector assembly 120 can further include, or be coupled to, an imaging processing module 124 that can include one or more processors or other computing device(s) and which performs computational video processing to both parse and combine or interleave image frames from the primary and secondary fields-of-view. The processed image frames can be provided to one or more displays 170 for viewing by a system user.

The optical system 100 includes two sets of front objective optics, one for the primary field-of-view, referred to as primary FOV optics 130, and one for the secondary field-of-view, referred to as secondary FOV optics 140. In one example the primary field-of-view is a narrow field-of-view, which may be used to obtain high magnification images of a specific target, for example, and the secondary field-of-view is a wide field-of-view, as may be used for situational awareness, for example. Each of the primary FOV optics 130 and the secondary FOV optics can include one or more lenses or mirrors configured to receive and direct the electromagnetic radiation 105 from the scene 110 towards a common or shared set of imager optics 150. The primary optics 130 collects and directs electromagnetic radiation corresponding to the primary field-of-view of the system, referred to herein as the primary FOV 135, that is processed by the detector assembly 120 to produce primary field-of-view images of the scene 110. Similarly, the secondary FOV optics 140 collects and directs electromagnetic radiation corresponding to the secondary field-of-view of the system, referred to herein as the secondary FOV 145, that is processed by the detector assembly 120 to produce secondary field-of-view image frames.

The optical system 100 further includes a field-of-view selection mechanism 160 that receives both the primary FOV 135 and the secondary FOV 145 and provides an output 165 to the imager optics 150. As discussed further below, the output 165 can include either or both of the primary FOV 135 and the secondary FOV 145. The imager optics 150 can include one or more lenses or mirrors configured to receive and focus the output 165 from the field-of-view selection mechanism 160 to the detector assembly 120 where the output is imaged by the imaging sensor.

As discussed above, in certain applications it is particularly advantageous to allow viewing or imaging of the secondary field-of-view without obscuring or interrupting viewing/imaging of the primary field-of-view. For example, it may be advantageous to allow viewing/imaging of a wide field-of-view to provide situational awareness without blocking a narrow field-of-view that is being used to track a target. Accordingly, in certain embodiments, the field-of-view selection mechanism is configured to pass the primary FOV 135 to the imager optics 150 and selectively also pass the secondary FOV 145 to the imager optics. Thus, in such embodiments, the output 165 from the field-of-view selection mechanism 160 includes either the primary FOV 145 alone or a combination of the primary FOV 135 and the secondary FOV 145. The field-of-view selection mechanism 160 can be configured to alter the output 165 between these two options upon command from a user or automatically, for example, periodically, such as frame-by-frame, every few frames, or with some other selected periodicity which may be fixed or variable.

The field-of-view selection mechanism 160 can be implemented using any of a variety of different structures, including, for example, a shutter mechanism or beamsplitter.

Figure 2:
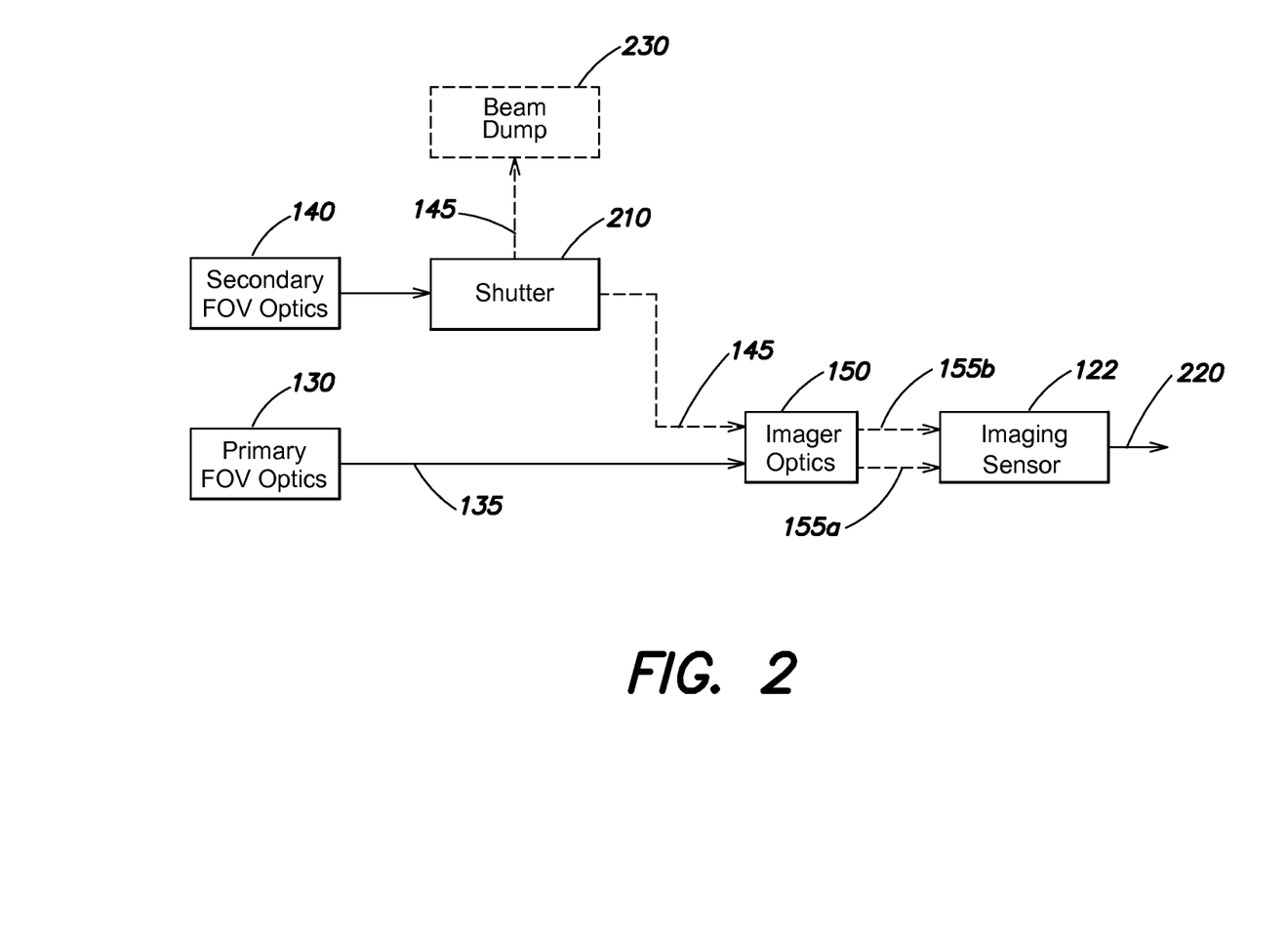
FIG. 2 is a block diagram of another example of the dual-field-of-view optical system according to aspects of the present invention.

Referring to FIG. 2, according to one embodiment, the field-of-view selection mechanism 160 includes a movable shutter 210 that can be moved selectively into and out of the optical path between the secondary FOV optics 140 and the imager optics 150. When the shutter 210 is open, the secondary FOV 145 is passed to the imager optics 150 along with the primary FOV 135. Thus, the electromagnetic radiation 155a passed to and imaged by the imaging sensor 122 includes both the primary FOV and the secondary FOV, and the image data 220 output from the imaging sensor 122 includes both fields-of-view. When the shutter 210 is closed, the secondary FOV 145 is reflected out of the optical path, and the electromagnetic radiation 155b provided from the imager optics 150 to the imaging sensor 122 includes only the primary FOV 135, as does the output image data 220. When the shutter 210 is closed, the secondary FOV 145 can simply be reflected away from the imager optics 150, or can be directed to an optional beam dump 230 to prevent unwanted stray reflections.

Figure 3A:
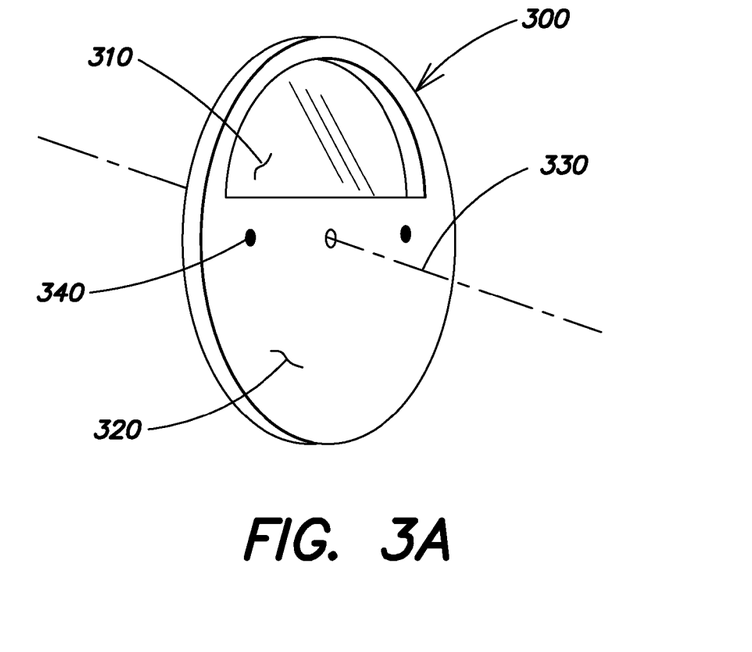
FIG. 3A is a diagram of one example of a shutter mechanism that can be used in a dual-field-of-view optical system according to aspects of the present invention.

The shutter 210 can include a movable bypass mirror, for example. In one example the shutter 210 includes a rotating shutter wheel that includes an open portion that transmits the secondary FOV 145 towards to the imager optics 150 and a blocking portion that blocks or reflects the secondary FOV. An example of a rotating shutter wheel 300 that can be used for the shutter 210 is illustrated in FIG. 3A. In this example, the shutter wheel 300 includes an open or transparent portion 310 and an opaque or blocking portion 320. The shutter wheel 300 is configured to rotate about a central axis 330. The shutter wheel 300 can be positioned in the optical path between the secondary FOV optics 140 and the imager optics 155 such that as it rotates, the open portion 310 and the blocking portion 320 are alternately moved into and out of the optical path, thereby selectively passing or blocking the secondary FOV 145. In the example illustrated in FIG.

Figure 3B:
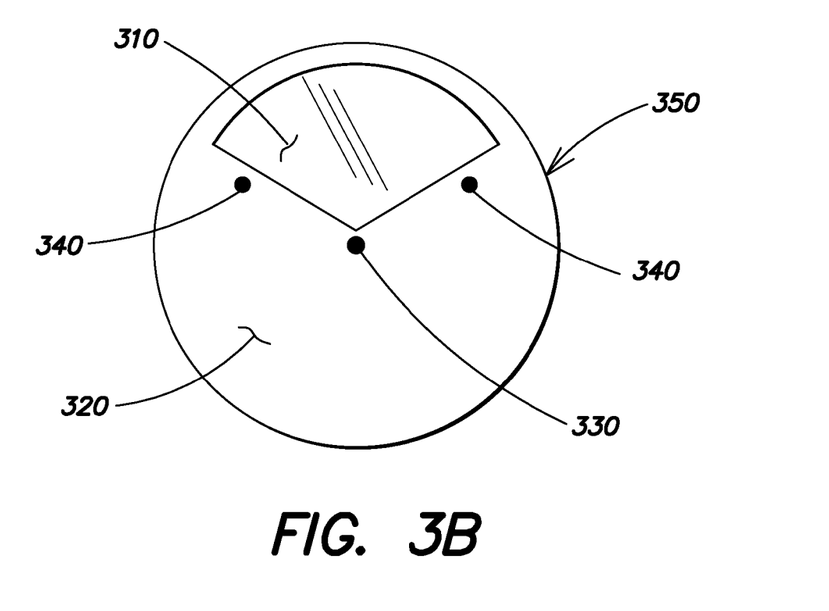
FIG. 3B is a diagram of another example of a shutter mechanism that can be used in a dual-field-of-view optical system according to aspects of the present invention.

3A, the shutter wheel 300 is configured to have an approximate "50/50" or 50% open duty cycle. That is, as the shutter wheel 300 rotates about the axis 330, the secondary FOV 145 will be passed approximately 50% of the time and blocked approximately 50% of the time. Thus, for a shutter rotation rate of 30 Hz, for example, and a sensor frame rate of 60 frames per second (fps), for example, the secondary FOV 145 will be imaged at a rate of approximately 30 fps. In this case, the secondary FOV 145 is passed to the imager optics 150 and collected at the imaging sensor 122 every other image frame. However, numerous other configurations of the shutter 210 can be implemented. For example, FIG. 3B illustrates an example of a rotating shutter wheel 350 that is configured to have an approximate "75/25" or 25% open duty cycle. Using such an example, the secondary FOV 145 is passed to the imager optics 150 and collected at the imaging sensor 122 approximately every fourth image frame. The configuration of the shutter wheel, such as the size of the open portion 310, and its rate of rotation, can be selected based on a desired frame rate for collecting imagery from the secondary field-of-view. In certain examples the shutter wheel can have an adjustable open portion 310, such that the size of the open portion, and resulting open duty cycle, can be changed by a system controller or user to balance performance between the primary and secondary fields-of-view in different circumstances and applications.

According to another embodiment, the field-of-view selection mechanism 160 can include a beamsplitter that combines the primary FOV 135 and secondary FOV 145 and passes the combined electromagnetic radiation to the imager optics 150. In certain examples the beamsplitter can be used in combination with a shutter in the secondary field-of-view optical path.

Figure 4A:
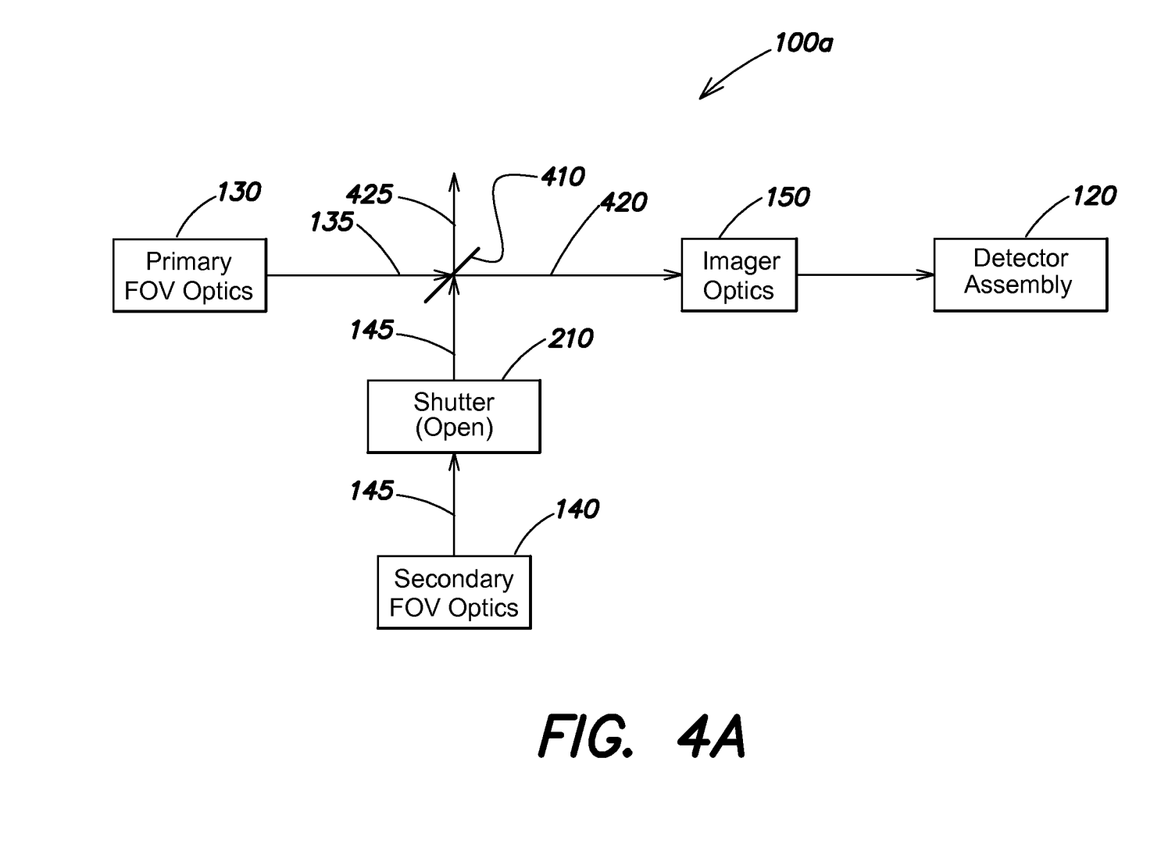
FIG. 4A is a block diagram of another example of a dual-field-of-view optical system showing ray paths for the shutter open condition, according to aspects of the present invention.
Figure 4B:
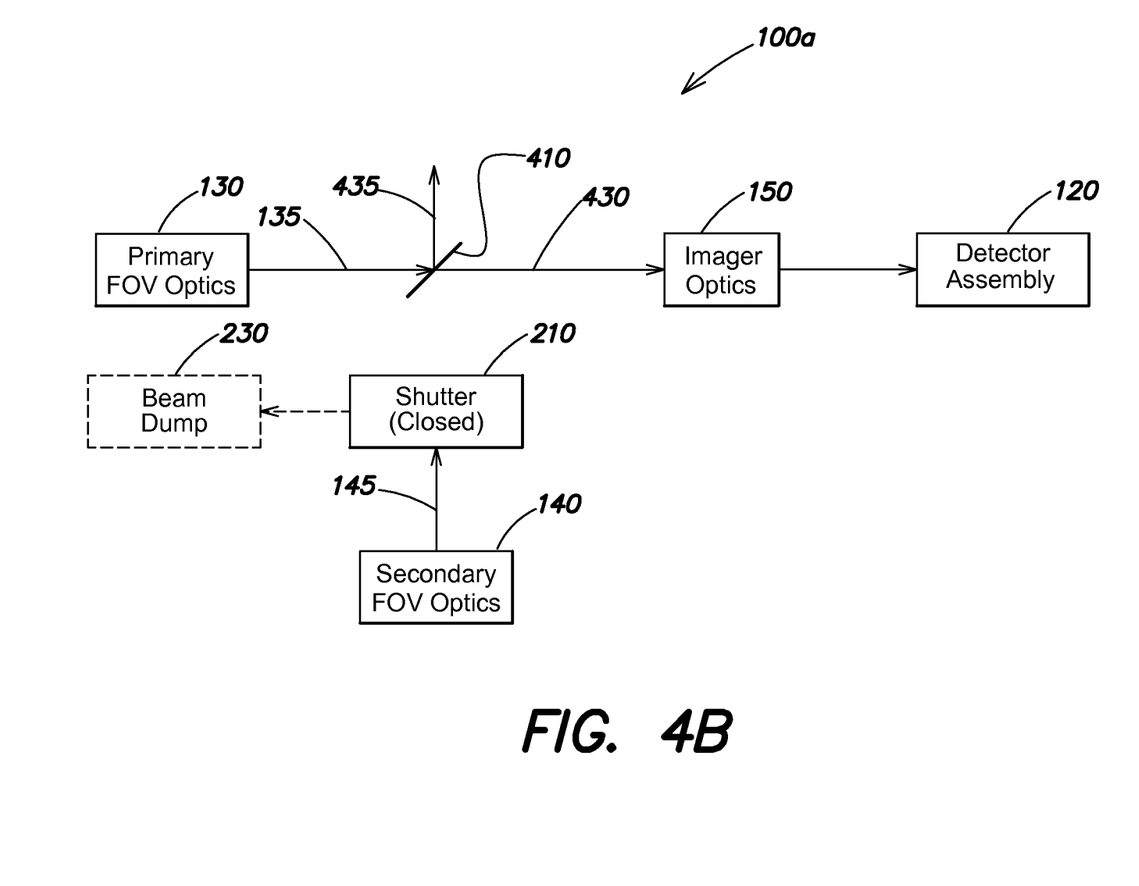
FIG. 4B is a block diagram of the dual-field-of-view optical system of FIG. 4A showing ray paths for the shutter closed condition, according to aspects of the present invention.

For example, referring to FIGS. 4A and 4B there is illustrated another example of an optical system 100a in which the field-of-view selection mechanism includes a combination of a wideband beamsplitter 410 and the shutter 210, which is positioned in the secondary optical path between the secondary FOV optics and the beamsplitter 410. The shutter can include a shutter wheel, such as those illustrated in FIG. 3A or 3B, or another configuration of a shutter than can selectively block the secondary FOV 145 from reaching the beamsplitter 410. FIG. 4A schematically shows the ray paths with the shutter 210 in the open position, and FIG. 4B schematically shows the ray paths with the shutter 210 in the closed position.

Whether the shutter 210 is open or closed, the primary FOV 105 is directed to the beamsplitter 410, and at least a portion thereof is directed from the beamsplitter to the imager optics 150. In the illustrated example, the portion of the primary FOV 135 that is directed to the imager optics 150 is transmitted through the beamsplitter 410. When the shutter 210 is open, the secondary FOV 145 is also directed to the beamsplitter 410, as shown in FIG. 4A, and at least a portion thereof is directed from the beamsplitter to the imager optics 150. Thus, in this case, the beamsplitter 410 combines the primary FOV 135 and the secondary FOV 145 to produce a beam 420 that is directed to the imager optics 150 and which includes at least a portion of the primary FOV and at least a portion of the secondary FOV. This beam is focused by the imager optics onto the detector assembly, where an image frame that includes imagery from both the primary field-of-view and the secondary field-of-view is produced.

When the shutter 210 is closed, the secondary FOV 145 is blocked from reaching the beamsplitter 410. Accordingly, in this case the beam 430 that is directed from the beamsplitter 410 to the imager optics 150 includes only at least that portion of the primary FOV 135 that is transmitted through the beamsplitter 410. In this case, the image frame produced at the detector assembly includes imagery from only the primary field-of-view. As discussed above, the blocked secondary FOV 145 can optionally be directed to a beam dump 230, as shown in FIG. 4B.

In certain examples the beamsplitter 410 is configured with a certain transmission/reflection ratio, such that some of the electromagnetic radiation incident thereon is transmitted through, and the remainder is reflected, as is illustrated in FIGS. 4A and 4B. In one example, the beamsplitter 410 is configured with a 70/30 ratio, such that approximately 70% of the electromagnetic radiation incident on the beamsplitting interface is transmitted through, and the remaining approximately 30% is reflected. This ratio is given in terms of the energy or intensity of the electromagnetic radiation, rather than being a spectral or spatial ratio. In other words, for a 70/30 ratio, approximately 70% of the energy or intensity of the incident electromagnetic radiation, across the entire spatial extent of the field-of-view and across the entire spectral range supported by the beamsplitter, is transmitted, and the remaining 30% is reflected. This operation is in contrast to dichroic beamsplitters that pass certain spectral bands and reflect other spectral bands.

Thus, in the illustrated example, ~70% of the energy of the primary FOV 135 is transmitted through the beamsplitter 410 towards the imager optics 150 (in beams 420 or 430 depending on whether the shutter 210 is open or closed), and the ~30% of the energy of the primary FOV 135 is reflected as beam 425 (for the shutter open case shown in FIG. 4A) or beam 435 (for the shutter closed case shown in FIG. 4B). Similarly, in this example, when the shutter 210 is open ~70% of the energy of secondary FOV 145 is transmitted through the beamsplitter 410 and discarded as beam 425 (along the with ~30% of the primary FOV 135), while the remaining ~30% of the energy of the secondary FOV 145 is reflected towards the imager optics 150 as beam 420. Table 1 below provides a summary of this operation.

TABLE 1

| Shutter Position | Primary FOV energy passing to imager optics | Secondary FOV energy passing to imager optics | Image frame content at detector assembly |
| --- | --- | --- | --- |
| Open | 70% | 30% | Combined frame |
| Closed | 70% | 0% | Primary-only frame |

Although the above-discussed example uses a 70/30 ratio for the beamsplitter, it is to be appreciated that the beamsplitter 410 can be configured with any ratio, not limited to 70/30. In certain applications, it is not necessary to have the same or similar performance, which may be affected by the amount of energy reaching the detector assembly, in the secondary field-of-view as in the primary field-of-view. In such applications, a 70/30 or similar transmission/reflection ratio for the beamsplitter 410 can be suitable. A system designer can select the transmission/reflection ratio to achieve a best performance balance between the two fields-of-view.

Thus, an optical system incorporating a field-of-view selection mechanism 160 as discussed above can simultaneously combine primary (for example, narrow) and secondary (for example, wide) fields-of-view through the use of the shutter 210 optionally in combination with the beamsplitter 410. A rotating shutter wheel, or other shutter mechanism, can selectively couple in the secondary field-of-view at a selected rate. As a result, a stream of image frames is produced at the output of the imaging sensor, some of which include imagery from only the primary field-of-view, whereas others are "combined" frames, including imagery from both the primary and secondary fields-of-view. As discussed above, imaging processing techniques can be used to separate these frames and process them to produce and display both a view of the primary field-of-view and a view of the secondary field-of-view.

Figure 5:
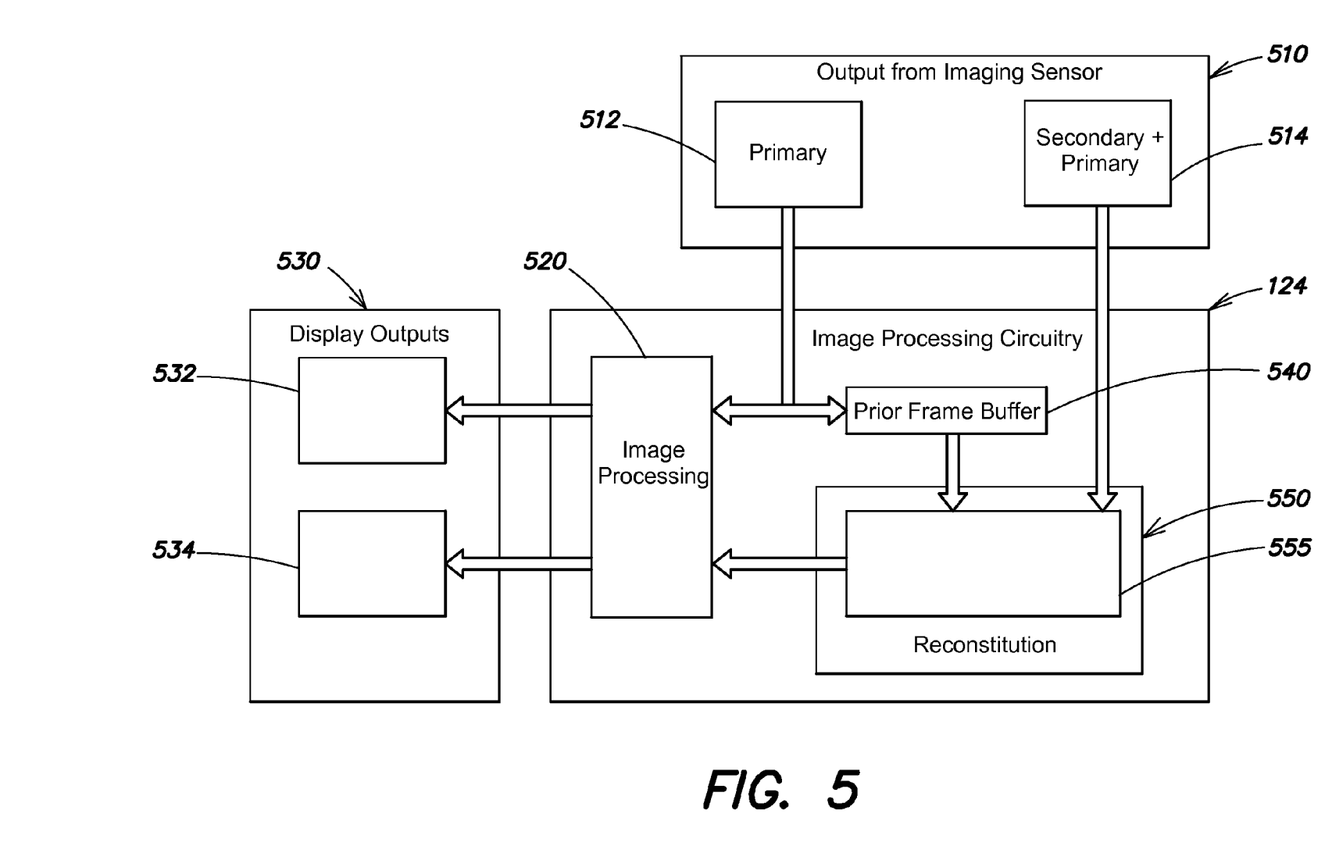
FIG. 5 is a functional block diagram of one example of an image processing sub-system and method for use with dual-field-of-view optical systems according to aspects of the present invention.

Referring to FIG. 5 there is illustrated a functional block diagram corresponding an example of an image processing sub-system and method according to certain embodiments. As discussed above, image processing circuitry 510 can be part of the detector assembly 120, or can be included in a separate component or system that is coupled to the detector assembly and capable of receiving image data from the detector assembly. The imaging processing circuitry 510, and components thereof, can be implemented in hardware, firmware, software, or combinations thereof.

According to one embodiment, the imaging processing circuitry 510 receives as inputs output image data 510 from the imaging sensor 122. As discussed above this output image data 510 includes certain image frames that correspond to the primary field-of-view only, referred to as primary image frames 512, and other image frames that include imagery from both the primary and secondary fields-of-view, referred to as combined image frames 514. At a specified frame rate of the imaging sensor, the primary image frames 512 and combined image frames 514 are sequentially and serially (i.e., one-by-one) provided to the image processing circuitry. The ratio and sequence of primary image frames 512 to combined image frames 514 can be controlled by controlling the speed at which the shutter 210 opens and closes. For example, as discussed above, using a rotating shutter wheel such as shutter wheel 300 shown in FIG. 3A with a 50/50 open/closed structure rotating at 30 Hz, and assuming a 60 fps imaging sensor, the output image data 510 alternates between primary image frames 512 and combined image frames 514, with every other image frame being a combined image frame. Thus, in this example, the primary field-of-view has a 30 fps frame rate. In another example, still using a 60 fps imaging sensor and instead using a 75/25 rotating shutter wheel, such as shutter wheel 300a shown in FIG. 3B, every fourth image frame of the output image data 510 is a combined image frame 514. As will be appreciated by those skilled in the art, any desired sequence of primary image frames 512 and combined image frames 514 can be created by appropriately selecting the shutter speed and the frame rate of the imaging sensor 122. In certain applications, it may be desirable to maintain a minimum frame rate for the primary field-of-view, such as at least 30 fps, regardless of the rate at which combined image frames 514 are produced and sequenced with the primary image frames 512.

Figure 6:
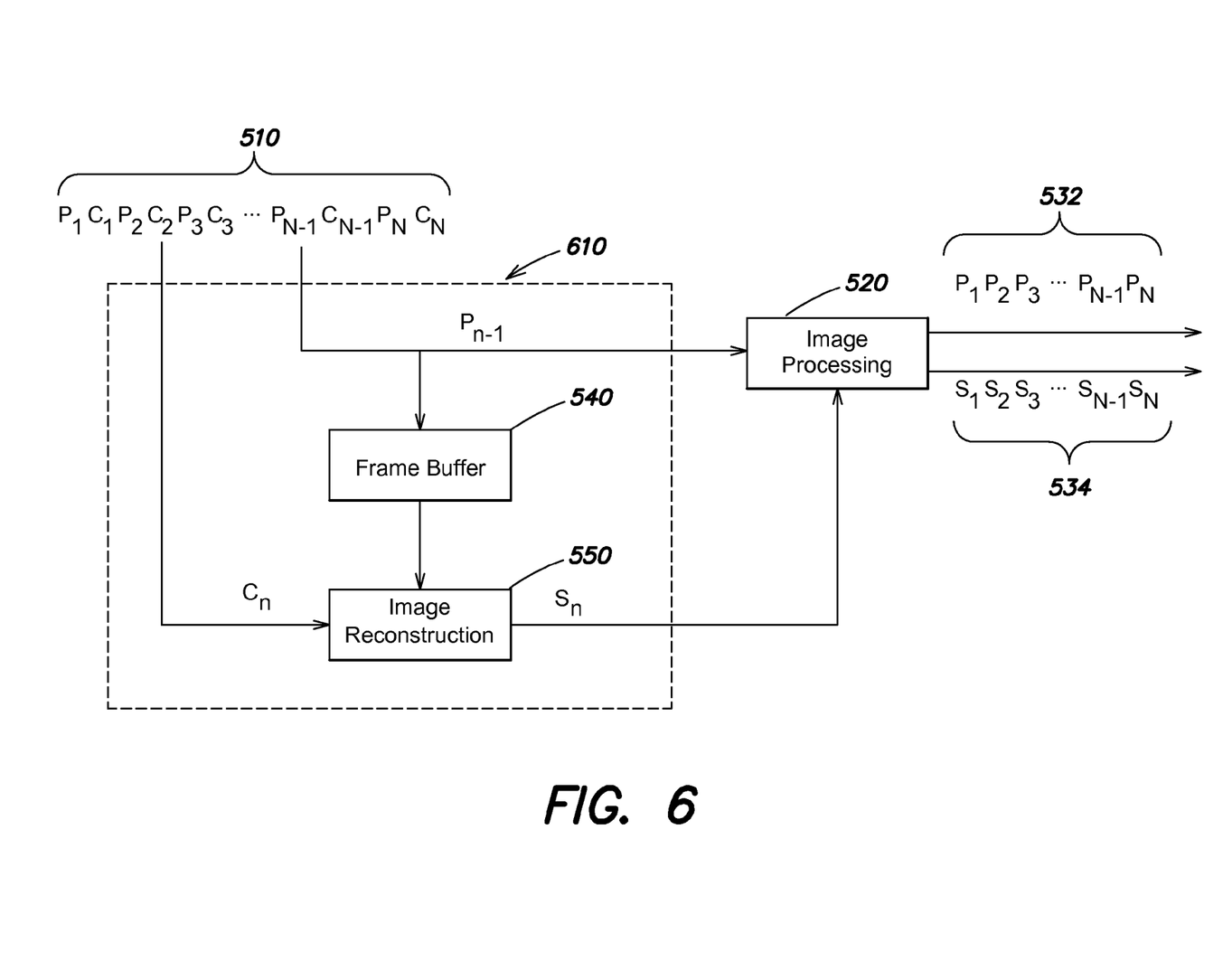
FIG. 6 is functional block diagram illustrating one example of an image processing process flow corresponding to the sub-system and method of FIG. 5, according to aspects of the present invention.

FIG. 6 illustrates an example of a process flow corresponding to the image processing sub-system and method of FIG. 5. In the example illustrated in FIG. 6, the field-of-view selection mechanism 160 is controlled such that every other image frame is a combined image frame. Thus, in this example the output 510 from the imaging sensor 122 is a stream of interleaved primary image frames ($P_n$) and combined image frames (CO, as shown in FIG. 6.

According to one embodiment, primary image frames 512 are provided to an image processing module 520 which processes and formats the primary image frames 514 for output and display. The image processing performed by the image processing module 520 can include any of a variety of well-known techniques and processes, including but not limited to, for example, adjusting signal gain, level, or color, formatting for a particular display type, etc. Thus, display outputs 530 from the system include a primary field-of-view display image 532 formed from the processed primary image frames from the image processing circuitry 510. The primary field-of-view display image 532 can include a series of "still" images, or a full-motion video stream, for example. The display outputs 530 can be provided to the display(s) 170 for viewing by a system operator, for example.

Still referring to FIGS. 5 and 6, the primary image frames 512 are also provided to a frame buffer 540 where at least one primary image frame is stored. The combined image frames 514 are provided to an image reconstitution module 550, along with the stored primary image frames from the frame buffer 540. In one example, each primary image frame ($P_n$) output from the imaging sensor 122 is both passed to the frame buffer 530 and to the image processing module 520, where it is processed and output for display. With each subsequent primary image frame, the prior frame in the frame buffer 540 is replaced with the subsequent frame. Thus, for each combined image frame ($C_n$) the frame buffer 540 always stores the most recent prior primary image frame ($P_{n-1}$).

Referring to FIG. 6, for each combined image frame ($C_n$), process 610 occurs. The current combined image frame 512 ($C_n$) in the output stream 510 is received by the image reconstitution module 550, along with the most recent prior primary image frame ($P_{n-1}$) from the frame buffer 540. The image reconstitution module 550 acts to process the combined image frame 514 ($C_n$) using the prior primary image frame 512 ($P_{n-1}$) to derive a secondary image frame 555 ($S_n$) that corresponds to the secondary field-of-view alone. In one example, the image reconstitution module 550 performs comparison and subtraction operations to "subtract out" the primary field-of-view imagery from the combined image frame 514 ($C_{n-1}$) by comparing the content or imagery in the combined image frame 514 ($C_{n-1}$) with that in the prior primary image frame 512 ($P_{n-1}$) and removing from the combined image frame the imagery that corresponds to that present in the prior primary image frame 512. The result "left over" after this comparison and subtraction is an approximation of the imagery that was collected from the secondary field-of-view only, and is provided to the image processing module 520 as a secondary image frame 555 ($S_n$). This operation can be described as:

$$(\text{primary}+\text{secondary})-\text{primary}=\text{secondary} \quad (1)$$

or:

$$S_n \approx C_n - P_{n-1} \quad (2)$$

Provided that the frame rate of the imaging sensor 122 is sufficiently high and that the rate at which combined image frames are included in the output data stream 510 (e.g. at a rate of every other frame, every $3^{rd}$ frame, or every $4^{th}$ frame, for example), there will be very little elapsed time between successive frames, such that the prior primary image frame (used by the image reconstitution module 550) contains imagery that is almost identical to that contained in the subsequent combined image frame. In this case, the secondary image frame 555 produced from the comparison and subtraction operations performed by the image reconstitution module 555 will be a very good approximation of the image that would be obtained by imaging the secondary field-of-view alone at the imaging sensor 122.

In certain embodiments, a system operator or designer can control and select the imaging sensor frame rate or the sequencing ratio of primary image frames to combined image frames (i.e., the rate at which combined image frames are included in the output data stream 510) to achieve an acceptable performance level for the image quality of the secondary field-of-view display images 534 balanced with a desired performance level for the primary field-of-view 532. For instance where it is expected that that viewed scene is rapidly changing (for example, when tracking a fast-moving target), it may be desirable to use an imaging sensor 122 with a high frame rate or a high rate of inclusion of the combined image frames (e.g., every other frame) in order to achieve acceptable image quality in the secondary image frames 555. Alternatively, in contexts where maximum primary field-of-view performance is desired, software or firmware functionality may hold the field-of-view selection mechanism 160 in a state that blocks the secondary field-of-view, and simultaneously inhibits the frame extraction process discussed above, enabling full frame rate capability of the system in the primary field-of-view.

Figure 7A:
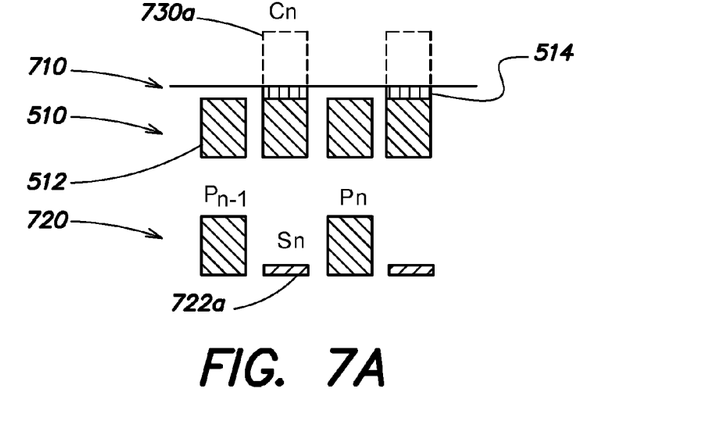
FIGS. 7A-C are diagrams illustrating relative imaging sensor saturation and derived signal error for various examples, according to aspects of the present invention.
Figure 7B:
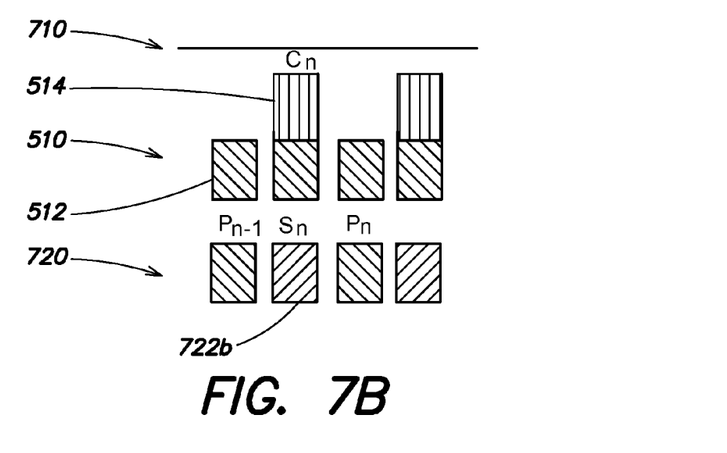
Figure 7C:
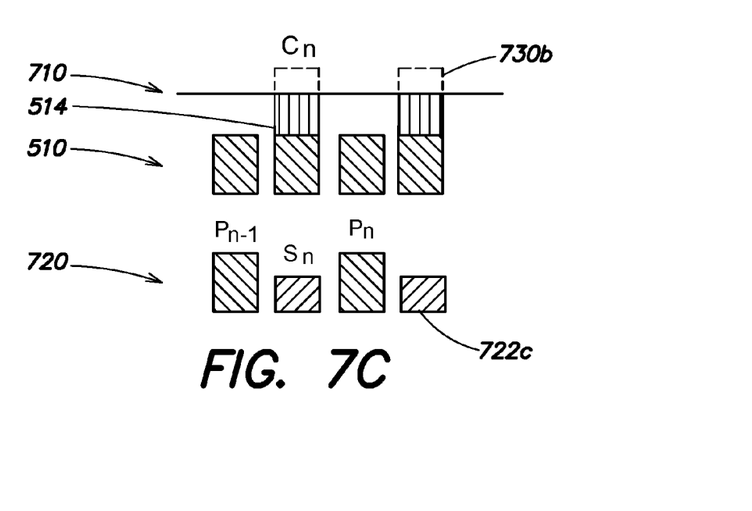

Referring to FIGS. 7A-C, according to certain embodiments, the saturation threshold of the imaging sensor 122 can be controlled, for example, by using filters, adjusting the exposure time, etc., in order to reduce error in the above-described frame subtraction process. In FIGS. 7A-C, line 710 represents the saturation threshold of the imaging sensor 122, and image frames 720 are the derived frames produced by performing the above-described frame subtraction process on the output 510 from the imaging sensor 122, which may be processed and output as display outputs 530. Referring to FIG. 7A, if the energy in the combined frames 514 ($C_n$) exceeds the imaging sensor saturation threshold 710, then subtracting the prior image frame 512 ($P_{n-1}$) would yield a very high error (diagrammatically illustrated by dashed box 730a) in the resulting derived secondary image frame 724a ($S_n$) in the case when the $P_{n-1}$ signal strength is a large fraction of the detector saturation level. As shown in this case, the energy in the derived secondary image frames 722a is low due to a large amount of energy in the combined frame 514 being lost because the saturation threshold 710 is exceeded, resulting in large error 730a. In contrast, referring to FIG. 7B, the saturation level of the imaging sensor can be increased such that the energy in the combined frames 514 is below the saturation threshold 710. In this case, the error in the derived secondary image frames 722b is greatly reduced compared to the case illustrated in FIG. 7A, or even eliminated (signal energy in the derived secondary image frames 722b is increased). However, in this case the sensitivity of the imaging sensor 122 for the primary field-of-view is decreased relative to the case illustrated in FIG. 7A. Thus, sensor sensitivity for the primary field-of-view can be traded off against error in the derived secondary field-of-view, and vice versa. For example, FIG. 7C illustrates a "compromise" case in which the saturation threshold 710 is set such that the energy in the combined image frames 514 exceeds the threshold, but by less than in the case illustrated in FIG. 7A, resulting in some error 730b in the derived secondary image frames 722c, but less than in the case illustrated in FIG. 7A. According to certain embodiments, the saturation threshold of the imaging sensor 122 can be dynamically controlled, for example, by selectively inserting a filter into the optical path ahead ("upstream") of the imaging sensor, or by adjusting the integration or exposure time for each frame. In this manner, dynamic adjustments and trade-offs between high sensitivity in the primary field-of-view and acceptable levels of error in the secondary field-of-view can be achieved.

As discussed above, in certain embodiments the imaging sensor 122 includes a two-dimensional array of pixels. Accordingly, in one example the image reconstitution module 550 can perform the comparison and subtraction operations pixel-by-pixel. Alternatively, the comparison and subtraction operations can be performed on groups of pixels, for example, row-by-row, column-by-column, or based on two-dimensional pixel groups (e.g., groups of 2×2 pixels, 4×4 pixels, or some other grouping). Mathematical operations and software algorithms for performing such comparison and subtraction operations between two image frames are well understood in the art. According to certain embodiments, time sensor integration can be based on marks that are included on the shutter to prevent blur in the combined image frames 514. For example, referring to FIGS. 3A and 3B, the rotating shutter wheels 300, 300a can be provided with reference marks 340 that can be used to prevent image blur.

Referring again to FIG. 5, the image processing module 520 processes and formats the received secondary image frames 555 for output and display. As discussed above, this imaging processing can include any of a variety of well-known techniques and processes, such as level/gain/color/contrast control, size formatting, etc., as commonly used in the art to process and format images for display. Thus, the display outputs 530 from the system further include a secondary field-of-view display image 534 formed from the processed secondary image frames ($S_n$) from the image processing circuitry 510. The secondary field-of-view display image 534 can include a series of "still" images, or a full-motion video stream, for example. In one example, the image processing module 520 temporally multiplexes the processed primary and secondary image frames to produce two full-motion video streams for the display outputs 530.

Thus, aspects and embodiments provide optical systems and image processing methods that enable the use of a single imager optical train 150 and imaging sensor 122 to accomplish simultaneous (temporally multiplexed) imaging of two fields-of-view. As discussed above, electromagnetic radiation from a primary and secondary field-of-view can be transmitted simultaneously to the imager optics 150 and detector assembly 120. Electromagnetic radiation from the primary field-of-view is present in every image frame, with the secondary field-of-view being selectively coupled in to certain "combined" image frames via the field-of-view selection mechanism 160. The combined image frames can be processed, as discussed above, to extract out imagery corresponding to the secondary field-of-view. In this manner, images from both the primary and secondary fields-of-view can be obtained using a single imaging sensor 122 (and shared imager optics 150) without obscuring the primary field-of-view.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A dual-field-of-view optical imaging system having a narrow field-of-view and a wide field-of-view and comprising:
   a detector assembly including an imaging sensor;
   narrow field-of-view objective optics configured to receive first electromagnetic radiation from a scene and to output the first electromagnetic radiation corresponding to the narrow field-of-view of the system;
   wide field-of-view objective optics configured to receive second electromagnetic radiation from the scene and to output the second electromagnetic radiation corresponding to the wide field-of-view of the system;
   imager optics configured to receive and focus the first electromagnetic radiation onto the imaging sensor, the imaging sensor being configured to produce narrow field-of-view image frames from the first electromagnetic radiation;
   a field-of-view selection mechanism disposed between the wide field-of-view objective optics and the imager optics and configured to selectively pass the second electromagnetic radiation to the imager optics, the imager optics being further configured to focus the second electromagnetic radiation onto the imaging sensor, and the imaging sensor being further configured to produce combined image frames from the first electromagnetic radiation and the second electromagnetic radiation together, the combined image frames including imagery from both the narrow and wide fields-of-view; and
   image processing circuitry coupled to the imaging sensor and configured to receive and process the narrow field-of-view image frames and the combined image frames from the imaging sensor, the image processing circuitry including an image reconstruction module configured, for each combined image frame, to:
      receive the combined image frame;
      receive a prior stored narrow field-of-view image frame;
      compare the combined image frame with the prior stored narrow field-of-view image frame to determine a content delta between the combined image frame and the prior stored narrow field-of-view image frame; and
      remove the imagery from the narrow field-of-view from the combined image frame based on the content delta to produce a wide field-of-view image frame.

2. The dual-field-of-view optical imaging system of claim 1 wherein the field-of-view selection mechanism includes a shutter at least a portion of which is selectively movable into an optical path between the wide field-of-view objective optics and the imager optics to block the second electromagnetic radiation from the imager optics, and selectively movable out of the optical path to pass the second electromagnetic radiation to the imager optics.

3. The dual-field-of-view optical imaging system of claim 2 wherein the field-of-view selection mechanism includes a rotating shutter wheel having a transmissive portion that passes the second electromagnetic radiation and a blocking portion that blocks the second electromagnetic radiation.

4. The dual-field-of-view optical imaging system of claim 1 wherein the field-of-view selection mechanism includes:
   a beamsplitter disposed between the imager optics and both the narrow and wide field-of-view objective optics; and
   a shutter positioned between the wide field-of-view objective optics and the beamsplitter, the shutter having an open state in which the second electromagnetic radiation is directed to the beamsplitter and a closed state in which the second electromagnetic radiation is blocked from reaching the beamsplitter.

5. The dual-field-of-view optical imaging system of claim 4 wherein, when the shutter is in the closed state, the beamsplitter is configured to transmit a first portion of the first electromagnetic radiation to the imager optics and to reflect a second portion of the first electromagnetic radiation; and
   wherein, when the shutter is in the open state, the beamsplitter is configured to receive and combine the first and second electromagnetic radiation, to transmit the first portion of the first electromagnetic radiation to the imager optics and to reflect the second portion of the first electromagnetic radiation, and to transmit a first portion of the second electromagnetic radiation to the imager optics and reflect a second portion of the second electromagnetic radiation with the second portion of the first electromagnetic radiation.

6. The dual-field-of-view optical imaging system of claim 1, wherein the image processing circuitry is further configured to output first display images produced from the narrow field-of-view image frames and corresponding to the narrow field-of-view, and second display images produced from a combination of the narrow field-of-view image frames and the combined image frames and corresponding to the wide field-of-view.

7. The dual-field-of-view optical imaging system of claim 6 wherein the imaging processing circuitry includes a frame buffer configured to store the narrow field-of-view image frames sequentially one-by-one, and wherein the image reconstruction module is configured to receive the prior stored narrow field-of-view image frame from the frame buffer.

8. The dual-field-of-view optical imaging system of claim 7 wherein the image processing circuitry is configured to process the wide field-of-view image frames to produce the second display images.

9. A method of simultaneously viewing two fields-of-view in an optical imaging system, the method comprising:
   collecting, over a narrow field-of-view, first electromagnetic radiation energy at an imaging sensor and producing therefrom a plurality of narrow field-of-view image frames;
   simultaneously collecting, over a wide field-of-view, second electromagnetic radiation energy using wide objective optics;
   selectively directing the second electromagnetic radiation energy to the imaging sensor;
   at the imaging sensor, producing a plurality of combined image frames from a combination of the first electromagnetic radiation energy and the second electromagnetic radiation energy;
   processing the plurality of narrow field-of-view image frames and the plurality of combined image frames to produce a first display image stream corresponding to the narrow field-of-view and to produce a plurality of wide field-of-view image frames for a second display image stream corresponding to the wide field-of-view, wherein producing the plurality of wide field-of-view image frames includes:
      receiving the combined image frame at an image reconstruction module;
      receiving a prior stored narrow field-of-view image frame at the image reconstruction module; and with the image reconstruction module, comparing the combined image frame and the prior stored narrow field-of-view image frame to determine a content delta between the combined image frame and the prior stored narrow field-of-view image frame; and removing imagery in the prior stored narrow field-of-view image frame from imagery in the combined image frame to produce the wide field-of-view image frame; and displaying the first and second display image streams.

10. The method of claim 9 wherein selectively directing the second electromagnetic radiation to the imaging sensor includes selectively moving a shutter into an optical path between the wide objective optics and the imaging sensor to block the second electromagnetic radiation energy from reaching the imaging sensor, and selectively moving the shutter out of the optical path to allow the second electromagnetic radiation energy to reach the imaging sensor.

11. The method of claim 9 wherein processing the plurality of narrow field-of-view image frames and the plurality of combined image frames includes sequentially storing each one of the plurality of narrow field-of-view image frames in a frame buffer, and wherein receiving the prior stored narrow field-of-view image frame includes receiving the prior stored narrow field-of-view image frame from the frame buffer.

12. The method of claim 11 wherein producing the second display image stream includes processing the plurality of wide field-of-view image frames.

13. The method of claim 9 further comprising dynamically adjusting a saturation threshold of the imaging sensor.

\* \* \* \* \*